March 24, 1970    H. G. BOTTOMLEY    3,501,870
MACHINE AND CONVEYOR ASSEMBLY
Filed Dec. 16, 1966    2 Sheets-Sheet 1
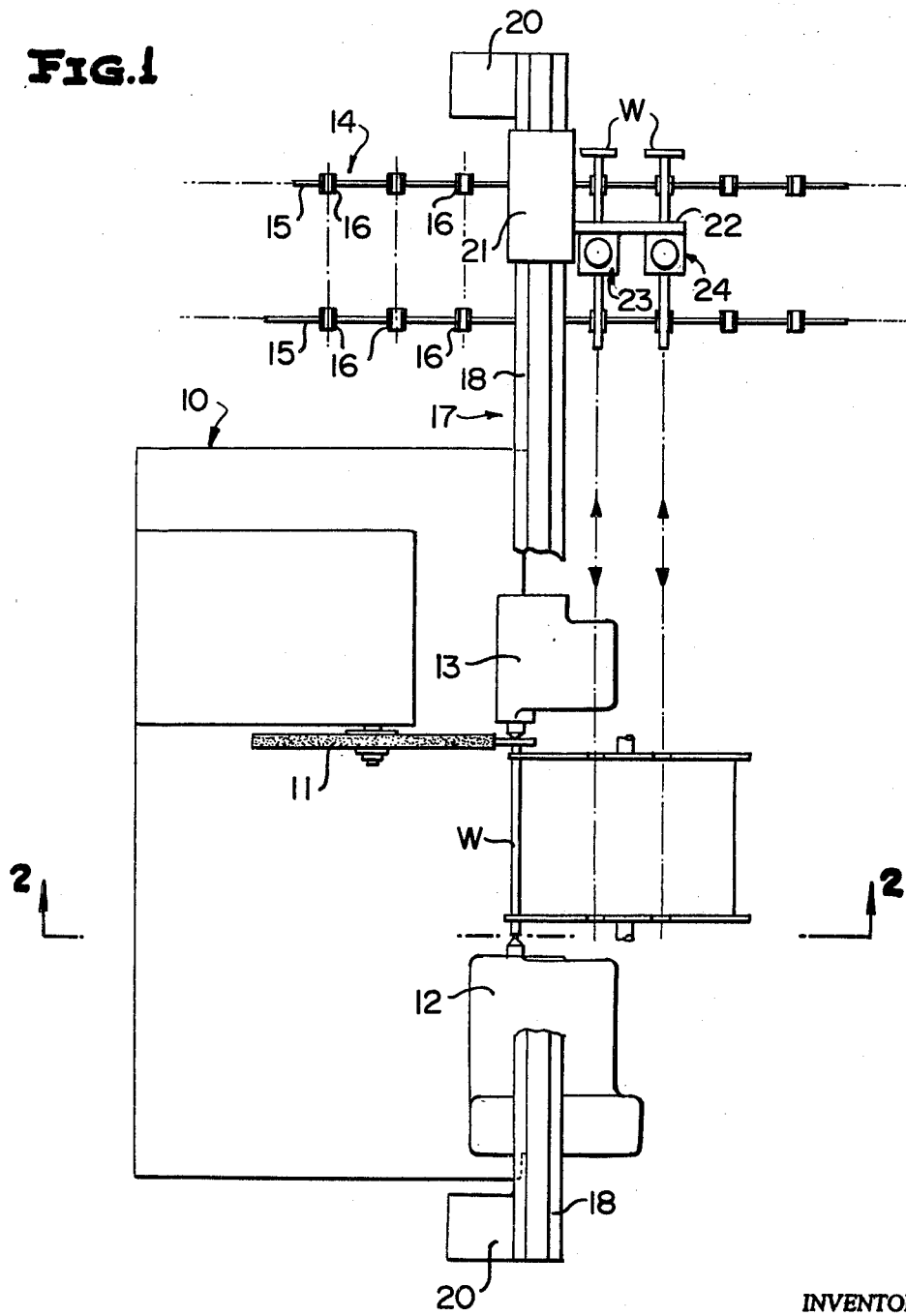
INVENTOR
HERBERT G. BOTTOMLEY March 24, 1970 H. G. BOTTOMLEY 3,501,870
MACHINE AND CONVEYOR ASSEMBLY
Filed Dec. 16, 1966 2 Sheets-Sheet 2
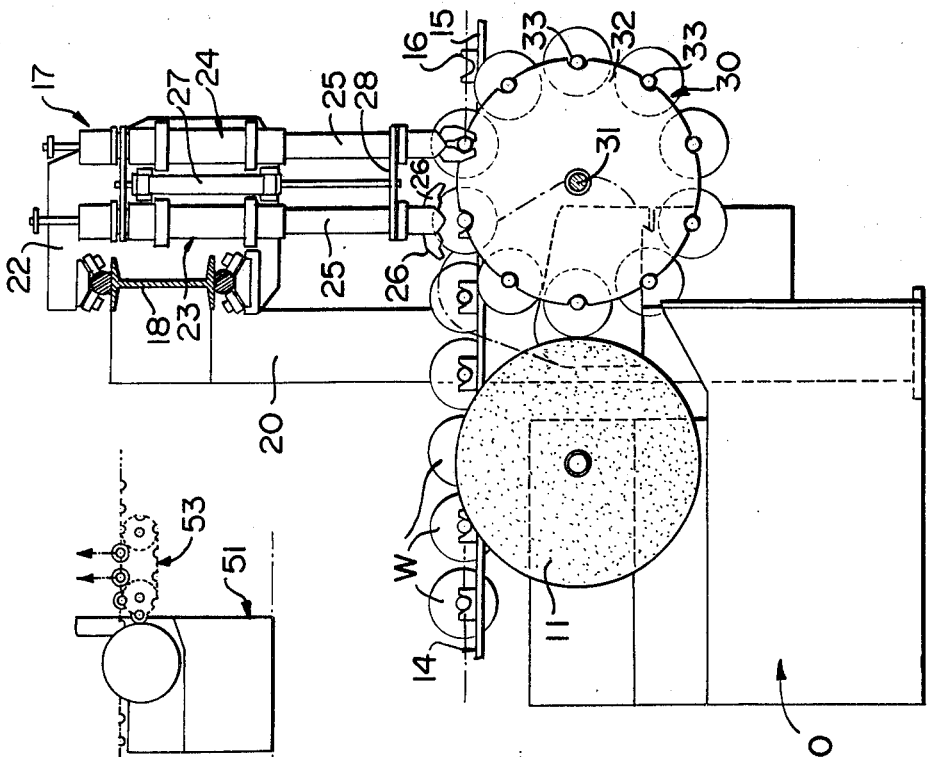
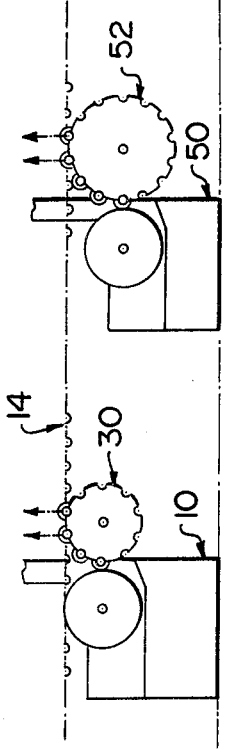
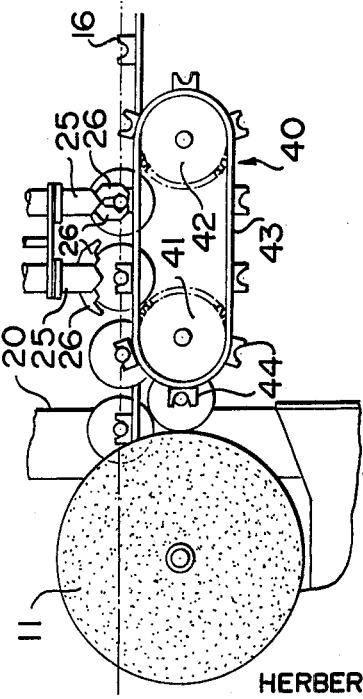
INVENTOR
HERBERT G. BOTTOMLEY
BY
Mason, Porter, Diller & Brown
ATTORNEYS

United States Patent Office 3,501,870
Patented Mar. 24, 1970

3,501,870
MACHINE AND CONVEYOR ASSEMBLY
Herbert G. Bottomley, Skipton, Yorkshire, England, assignor to Landis Lund Limited, Crosshills Keighley, York County, England, a corporation of Great Britain
Filed Dec. 16, 1966, Ser. No. 602,342
Int. Cl. B24b 47/02, B23q 5/22, 7/00
U.S. Cl. 51—215                            12 Claims

ABSTRACT OF THE DISCLOSURE

A carrier which is interposed between a transfer mechanism and a machine tool wherein the carrier is of a type having work receiving and discharge stations at the same elevation as a work conveyor and another station at the same elevation as and in alignment with work receiving mechanism of a machine whereby the transfer mechanism may have pick-up and discharge positions at the same elevation.

---

This invention concerns the problem of supplying workpieces to a machine from a conveyor and the subsequent removal of the workpieces which have been worked upon and the return thereof to the conveyor.

In the use of machines for continuous production purposes, workpieces are brought to and removed from the machine by one or more conveyors. It is desirable that the workpieces be automatically transferred from the conveyor to the machine and then returned to the conveyor after the necessary work has been performed thereon. Such an arrangement has, however, provided two difficulties. First, if the height of the conveyor does not match the work station height of the machine, it is necessary that the transfer mechanism be of a relatively complicated design so that it will have one height at the conveyor and another height at the machine. The other alternative would be to make special provisions to have the conveyor and the working station of the machine at the same height.

A second deficiency of the usual machine feeding and unloading arrangement is that the workpiece on which work has been performed must be removed from the machine before the new workpiece is positioned therein. This, of course, is undesirably time consuming and requires a complicated transfer mechanism to accomplish this sequence.

According to this invention, in operating a machine assembly including a machine having a working station for performing a work operation on a workpiece and conveyor means for delivering the workpieces to and carrying them from the machine, the workpieces are transported between the conveyor means and the machine working station in two series-arranged stations in one of which they are taken around an endless path wherein they are presented to and removed from the working station in a single continuous movement of the workpiece transporter.

The work handling apparatus of this invention may conveniently include two work loading mechanisms constituting the two states referred to above, of which one loading mechanism is preferably a rotary carrier, such as an indexing drum or an endless conveyor having a plurality of equally spaced workpiece receiving stations each of which is presented in its turn to the work station of the machine in order both that a new workpiece may be supplied to the work station and that a worked upon workpiece may be carried away therefrom. The other workpiece loading mechanism may then conveniently take the form of arms displaceable between the first-mentioned loading mechanism and the conveyor and provided with workpiece engaging means for picking up and setting down workpieces at those two locations.

By virtue of the work handling apparatus provided by this invention, any disparity in height between the work station of the machine and the track height of the conveyor may be readily taken up in the first-mentioned loading mechanism without requiring adjusting of the machine mounting and without requiring the provision of additional and complicated controls for causing the other workpiece loading mechanism to take up or set down workpieces at two different levels. Moreover, in the particular case where a rotary carrier is interposed between a machine work station and a loading mechanism including displaceable arms, usually a pair of arms, the arms may be so operated as to simultaneously deliver a new workpiece to the rotary carrier and to remove a worked upon workpiece therefrom, thereby eliminating the need to advance and retract each of the arms in succession and the consequent idle time of the machine while these operations are taking place. In this way, increased utilization and greater output of the machine is achieved.

A further feature of this invention is the fact that a number of different machines may be supplied by a single conveyor where the machines are of different heights.

Although this invention is adaptable to all types of machine installations, it is particularly adaptable to machine tools.

With the above and other objects in view that will hereinafter appear, the nature of the invention will be more clearly understood by reference to the following detailed description, the appended claims and the several views illustrated in the accompanying drawings:

In the drawings:

FIGURE 1 is a plan view of a conveyor and machine tool assembly incorporating the transfer mechanism which is the subject of this invention.

FIGURE 2 is a fragmentary transverse vertical sectional view taken along the line 2—2 of FIGURE 1 and shows more specifically the relationship of the conveyor, the machine and the transfer means.

FIGURE 3 is a fragmentary sectional view similar to FIGURE 2 and shows a modified form of work carrier.

FIGURE 4 is a schematic side elevational view showing the manner in which a plurality of machines of different height may be adapted for receiving workpieces from a conveyor of a fixed height which is different from that of any of the machines.

Referring now to the drawings in detail, it will be seen that there is illustrated in FIGURE 1 a machine which is generally referred to by the numeral 10. The illustrated machine 10 is a grinder and includes a grinding wheel 11 which is suitably mounted for rotation and adjustment for the purpose of grinding a workpiece W. During the grinding of a workpiece W, the workpiece is supported by a headstock 12 and a tailstock 13 with the headstock and the tailstock defining a work receiving mechanism.

In order that workpieces may be delivered to the machine tool 10 and machined workpieces may be removed therefrom, there is positioned adjacent the grinder 10 a work conveyor 14 which has a path of movement generally normal to the position of a workpiece in the machine 10. The conveyor 14 may be of any desired type and is illustrated as being formed of two endless chains 15 which carry suitable workpiece supports 16. It is to be noted that the workpiece supports 16 are uniformly spaced.

The workpieces W are transferred from the conveyor 14 to the machine 10 and returned by means of a transfer mechanism which is generally referred to by the numeral 17. The transfer mechanism 17 includes an overhead rail or gantry 18 supported at the opposite ends thereof by means of suitable uprights 20 and extending across both the conveyor 14 and the machine tool 10. The rail 18 supports a saddle or carriage 21 which is automatically movable from a position generally overlying the conveyor 14 to a position generally overlying the machine tool 10. Suitable control means (not shown) of any desired conventional type will be provided to effect the traversing movement of the carriage 21 on the rail 18 and the automatic positioning thereof relative to the conveyor 14 and the machine tool 10. The carriage 21 includes an offset support 22 which, in turn, carries a pair of lifter mechanisms 23, 24. The lifter mechanisms 23, 24 are identical and each includes a depending arm 25 having at the lower end thereof a pair of pivotally mounted clamping fingers 26. The clamping fingers 26 will be specifically configurated for grasping a workpiece W.

The lift mechanisms 23, 24 are simultaneously actuated by means of a single fluid motor 27 which is centrally located and which is operatively connected to a connecting bar 28 extending between the two arms 25.

It will be evident from FIGURE 2 that the height of the workpieces supported by the conveyor 14 is different from that of the headstock and tailstock centers of the grinder 10. If the arms 25 were to deliver and remove workpieces from the grinder 10, it would be necessary for the arms to operate at one elevation with the arms associated with the conveyor 14 and at a different elevation when they are associated with the grinder 10. Also, some means would have to be provided for sequentially presenting the arms and their associated fingers 26 to the grinder 10 whereby a ground workpiece could be first removed and then a new workpiece presented. All of these difficulties have been simply prevented by the provision of a carrier which is generally referred to by the numeral 30.

The illustrated form of carrier shown in FIGURES 1 and 2 is of the drum or turret type having a horizontal shaft 31 on which a pair of discs 32 is mounted. The discs 32 are illustrated as having suitable pockets or work receiving stations 33 for the reception of workpieces W. For simplicity purposes, the workpieces W could be retained in the pockets 33 by means of magnets. It is, however, to be understood that the workpiece holding means of the carrier 30 may be of any desired conventional type.

The shaft 31 of the carrier 30 will be suitably mounted in supports (not shown) either formed as a part of the grinder 10 or separate and apart therefrom. It is to be understood that the indexing of the carrier 30 will be automatically accomplished in any conventional manner not shown.

It is to be noted that the carrier 30 has three requirements. The spacing of the work receiving stations 33 must be such that two of the stations will align with the arms 25 in each indexed position thereof. Also, these two stations must be at the same elevation as the work supports 16 of the work conveyor 14. Further, at each indexing of the carrier 30, there must be one of the work receiving stations 33 aligned with the headstock 12 and the tailstock 13 of the grinder 10. Although in FIGURE 2 the spacing of the work receiving stations 33 is equal to the spacing of the arms 25, it is to be understood that the spacing could be one-half the distance between the arms 25, for example.

From the foregoing, it will be apparent that by, in a very simple way, appropriately arranging the diameter of the carrier 30, the height difference between the conveyor 14 and the axis of the headstock and tailstock of the grinder 10 is taken up by the rotary indexing motion of the carrier. At the same time, a significant improvement in the rate of operation of the grinder is achieved since the two arms 25 may be lowered and raised simultaneously instead of successively, thereby simultaneously delivering a new workpiece to the carrier and removing a ground or machined workpiece therefrom. It is to be further understood that the arms 25 may function to position and remove workpieces while a workpiece is being ground. In this way, the idle time of the machine is restricted to the indexing time of the carrier 30 and not the time required to load and unload the carrier 30.

Of course, a further advantage of the invention is that by providing the carrier 30 with work receiving and work discharging stations at the same elevation as the work conveyor 14, only a single setting for the height of the operative positions of the arms 25 and the associated fingers 26 is necessary. This, of course, results in a material savings with respect to the control mechanism.

Reference is now made to FIGURE 3 wherein the machine 10 is illustrated as having associated therewith a modified form of carrier which is generally referred to by the numeral 40. In certain instances it may be advantageous to provide the carrier in the form of an endless belt or chain type conveyor as opposed to the drum or turret type of carrier 30. The carrier 40 would be of the conventional endless belt or chain type and include a pair of support assemblies 41, 42 of which one is driven. Endless belts or chains 43 would be entrained over the support assemblies 41 and 42 and would carry suitable work supports 44.

The requirements of the carrier 40 will be the same as those of the carrier 30. The carrier 40 must have, at each indexing thereof, two work supports 44 which are at the same elevation as the work supports 16 of the work conveyor 14. Secondly, these two work supports 44 must be spaced apart a distance corresponding to the spacing of the arms 25. Also, at each indexing of the carrier 40, there must be a work support 44 aligned with the axis of the spindles of the headstock 12 and the tailstock 13 of the machine 10. It is to be understood that the carrier 40 will be indexed in timed relation with the operation of the machine 10 in any conventional manner.

It is also to be understood that while the carriers 30 and 40 are provided with horizontal axes, the conveyors could, for certain machines, have vertical axes.

Reference is now made to FIGURE 4 wherein the conveyor 14 is illustrated as supplying and receiving workpieces from three machines of different constructions. One of the machines may be the machine 10. A second machine is identified by the numeral 50 while the third machine is identified by the numeral 51. The machine 10, of course, has the carrier 30 associated therewith to compensate for the difference of the work receiving height of the machine and the height of the conveyor 14. It is to be noted that the height of the work receiving area of the machine 50 is less than that of the machine 10. Accordingly, it is provided with a larger diameter carrier 52.

The machine 51 has its work receiving area elevated as compared to the machines 10 and 50. It will be noted that the elevations of the work receiving area of the machine 51 and the conveyor 14 are to close for a third or drum type carrier 30. Accordingly, the machine 51 is provided with an endless chain or belt type carrier 53 which corresponds to the carrier 40 of FIGURE 3. It will be readily apparent from FIGURE 4 that each of the rotary carriers 30, 52 and 53 has an effective radius equal to the spacing of the work receiving station of the associated machine from the conveyor 14.

Although only several preferred embodiments of the invention have been specifically illustrated and described herein, it is to be understood that minor variations may be made in the carrier arrangements without departing from the spirit of the invention.

I claim:

1. In an assembly including a work conveyor disposed at a first elevation, a machine having a work receiving mechanism disposed in spaced relation from said work conveyor and at a second and different elevation, and a transfer mechanism for transferring workpieces axially from said conveyor to said machine and return; the improvement residing in a carrier having a plurality of stations, one of said stations being at said first elevation and another of said stations being at said second elevation and in alignment with said work receiving mechanism, whereby said transfer mechanism will have the pick-up and discharge positions thereof at the same elevation.

2. The assembly of claim 1 whereby said work conveyor has a plurality of work receiving stations, and said one carrier station is aligned with a work conveyor station at the time of transfer.

3. The assembly of claim 1 wherein said carrier is an endless conveyor.

4. The assembly of claim 1 wherein said carrier is an endless conveyor in the form of a rotary carrier.

5. The assembly of claim 1 wherein said carrier is an endless conveyor of the chain and belt type.

6. The assembly of claim 1 wherein said carrier is an endless conveyor, and the spacing of said work conveyor stations is the same as the spacing of said carrier stations.

7. The assembly of claim 1 wherein said transfer mechanism is of the dual action type and includes a first unit for delivering workpieces and a second unit for receiving workpieces, and said carrier has a third station at the same elevation as said first station, the spacing between said first and third stations corresponding to the spacing between said transfer mechanism units.

8. The assembly of claim 7 wherein said work conveyor has a plurality of equally spaced work receiving stations, and the spacing of the stations of said work conveyor and said carrier corresponding to the spacing between said transfer mechanism units.

9. The assembly of claim 1 wherein there are a plurality of machines supplied by said work conveyor, said machines having work receiving mechanisms at varying elevations, and said machines having said carriers as required to compensate for the differences in elevations of the respective work receiving mechanisms as compared to the elevation of said work conveyor.

10. The assembly of claim 1 wherein said machine is a machine tool.

11. Apparatus for transferring workpieces between a conveyor and a plurality of machines, each having its point of operation at a different elevation relative to the conveyor, comprising transfer devices for transferring workpieces between said conveyor and said machines, each of said machines having a rotary work carrier for receiving workpieces from said transfer devices and carrying the workpiece to the point of operation in the machine, each carrier having a radius corresponding to the difference in elevation between the conveyor and the point of operation in each machine, whereby the portion of each carrier in position to receive a workpiece is at the same elevation as the conveyor.

12. The assembly of claim 1 wherein said carrier is disposed immediately adjacent said machine and is spaced from said work conveyor.

References Cited
UNITED STATES PATENTS

| | | |
|---|---|---|
| 1,017,880 | 2/1912 | Landis. |
| 1,109,948 | 9/1914 | Turner. |
| 1,974,696 | 9/1934 | Swanson _____ 51—53 |
| 2,062,106 | 11/1936 | Reinhardt _____ 51—108 X |
| 2,110,931 | 3/1938 | Dyer. |
| 3,073,074 | 1/1963 | Price. |

ROBERT C. RIORDON, Primary Examiner

D. G. KELLY, Assistant Examiner

U.S. Cl. X.R.

198—19, 103, 106, 107